Aug. 15, 1961 J. H. BOICEY ET AL 2,996,416
METHOD AND APPARATUS FOR LAMINATING GLASS-PLASTIC SANDWICHES
Filed April 6, 1959
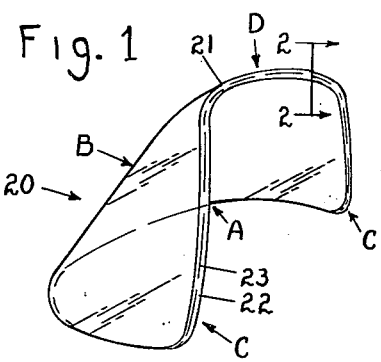
Fig. 1
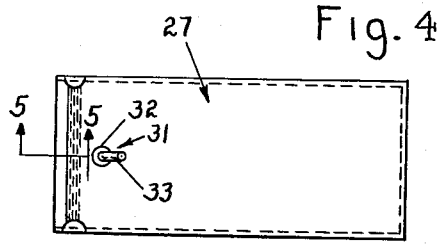
Fig. 4
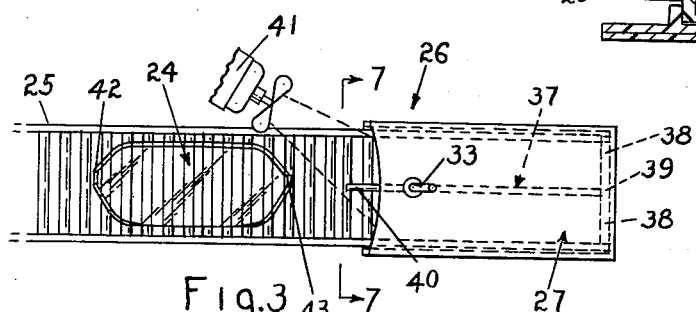
Fig. 3
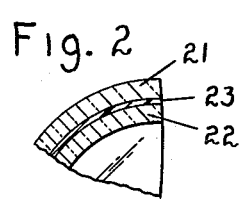
Fig. 5
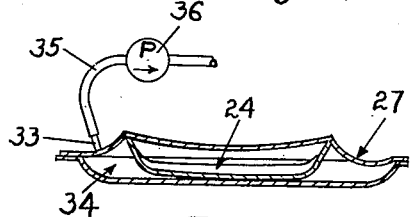
Fig. 6
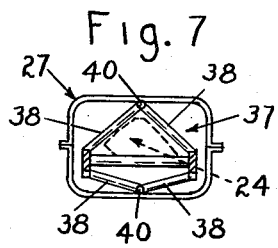
Fig. 2 / Fig. 7
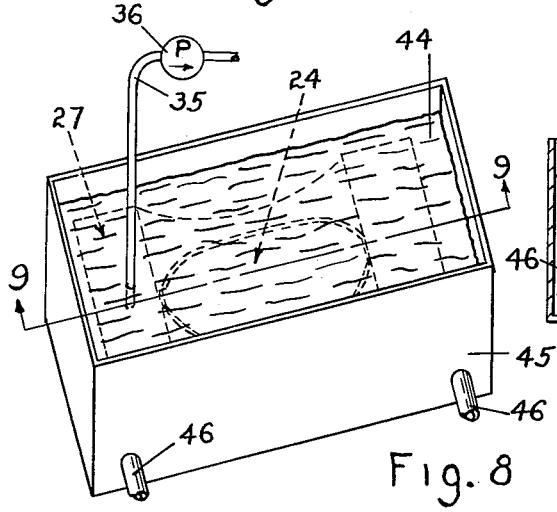
Fig. 8
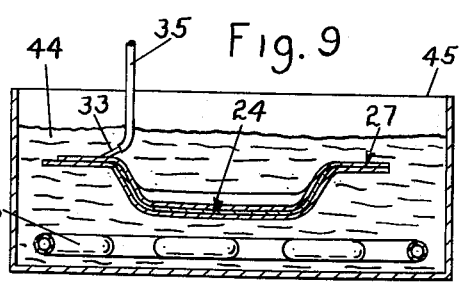
Fig. 9
INVENTORS
James H. Boicey and
BY William J. Hubbard
Nobbe & Swope
ATTORNEYS ously have 15, 1961

2,996,416
METHOD AND APPARATUS FOR LAMINATING
GLASS-PLASTIC SANDWICHES
James H. Boicey and William J. Hubbard, Toledo, Ohio,
assignors to Libbey-Owens-Ford Glass Company,
Toledo, Ohio, a corporation of Ohio
Filed Apr. 6, 1959, Ser. No. 804,441
2 Claims. (Cl. 154—2.7)

This invention broadly relates to laminated safety glass and more particularly to an improved method and novel apparatus for preliminarily pressing together assembled pairs of glass sheets and a similar sheet of plastic during the production of laminated windshields.

Briefly stated, laminated safety glass is made up of two or more sheets or plates of glass with an interposed layer, or layers, of nonbrittle plastic material, all bonded together under the influence of heat and pressure to form a composite transparent structure. In the manufacture of this type of glass, it is customary to first assemble the various layers or laminae in proper superimposed relationship to form a sandwich of glass and plastic; to then prepress the assembly to drive out entrapped air and moisture from between the various layers and to give a preliminary adhesion; and then to finally and permanently bond the several layers together by subjecting the assembly to the combined action of heat and elevated pressure in an autoclave.

In the most commonly used commercial method of manufacture, a roll-type press having rubber surface rolls is used to prepress the so-called sandwich. Such a roll-type press has been found quite satisfactory even in the manufacture of curved laminated safety glass since it has been usual to first pass the curved glass-plastic laminae through one set of rolls; to then heat the sandwich and then to again pass it between a second set of rolls. In fact, a form of this general procedure has been successfully used in prepressing the now popular so-called "panoramic" windshields which are severely curved to provide vision at the forward corners as well as across the front of the car. However, with further streamlining of automobiles, these panoramic windshields have lately been redesigned to extend upwardly and then sweep back in a smooth curve to blend into the roof panel of the car to produce what is now aptly termed a "cap" windshield. Such an extreme windshield construction involves severe bends about both major axes of the glass sheets used to produce it. In other words, the usual longitudinal bends about the transverse axis of the sheets are necessary to form the centrally disposed shallow curvature and the sharply curved end sections as in the prior panoramic windshields but in addition, a severe bend about the longitudinal axis of the sheets is required to form the curvature of the so-called cap portion and this makes the prepressing of such windshields with conventional roll-type presses a virtual impossibility.

It has also been known in the prior art to prepress glass-plastic sandwiches by placing a sandwich to be laminated in a flexible bag, evacuating the bag so as to remove air from between the several sheets comprising the sandwich, sealing the bag, and placing it into an autoclave where the final pressing of the sandwich takes place.

However, this latter method as heretofore practiced has proven to be extremely costly, particularly in view of the number of operators necessary to carry out the process and also because these prior methods have proven excessively time consuming. In addition, it has heretofore proven difficult to properly introduce even flat or simply curved sheets of glass into the prepressing bags so that the severely bent cap windshields presently being used have accentuated the above discussed deficiencies.

It is therefore a primary object of the present invention to provide a method and apparatus for inserting the prelamination sandwich into the plastic bag which method and apparatus will overcome the above enumerated deficiencies that have plagued the prior art.

It is therefore an important object of the present invention to provide an improved method and apparatus for inserting the prelamination sandwich into the plastic bag.

Another object of the invention is to provide a method and apparatus in which the preliminary pressing of the glass-plastic sandwiches is effected without the use of prepressing rolls.

Other objects and advantages of the invention will become more apparent during the course of the following description when taken in connection with the accompanying drawings.

In the drawings wherein like numerals are employed to designate like parts throughout the same:

FIG. 1 is a perspective view of one type of automobile windshield;

FIG. 2 is a fragmentary sectional view along the lines 2—2 of FIG. 1;

FIG. 3 is a top plan view of the conveyor apparatus used in accordance with the present invention;

FIG. 4 is a plan view of a bag containing a laminated glass sheet;

FIG. 5 is a sectional view taken along lines 5—5 of FIG. 4;

FIG. 6 is a side elevation in section showing a glass sandwich within a plastic bag before the evacuation of the air;

FIG. 7 is a sectional view taken along the lines 7—7 of FIG. 3;

FIG. 8 is a top perspective view showing the bag and laminated glass assembly immersed according to the present invention in a hot liquid solution; and FIG. 9 is a sectional view taken along the lines 9—9 of FIG. 8.

Briefly stated, the invention illustrated in the drawings and to be hereinafter described provides an improved apparatus employing a vacuum bag for preliminary lamination of a glass sandwich and most particularly related to an improved method of inserting a sandwich into a bag prior to the evacuating of the bag.

Referring now to the drawings, and most particularly to FIG. 1, there is shown a so-called cap windshield 20 in which there is combined the advantageous features of the presently popular panoramic type of windshield with the recently developed upwardly extended curved cap portion for increasing viewing area. A windshield of this modern character has a lower portion A which includes a central portion B of substantially shallow curvature and rather sharply rearwardly curved end sections C. These sections are bent in the longitudinal axis of the windshield and about the transverse axis thereof. On the other hand, the upper portion of this particular embodiment of a windshield is curvedly swept back by bending the glass sheets about the longitudinal axis thereof as indicated by the letter D, to produce a cross curvature in the transverse axis. Such a windshield is accordingly bent not only to enclose the forward opening of the automobile but is simultaneously shaped to curve upwardly and blend into the roof panel of the vehicle. As seen in FIG. 2 the windshield 20 includes two glass sheets 21 and 22 and a plastic interlayer 23.

According to the practice of the present invention the glass sheets 21 and 22 and interlayer 23 forming the windshield are loosely joined to form a unit or sandwich 24 which unit is laid upon a conveyor 25 (FIG. 3) and carried along that conveyor towards the assembly station generally indicated at 26. Referring now to FIGS. 4 and 5 there is shown a laminating bag or envelope 27 including a fabric envelope portion 28, having a .020 inch vinyl coating and a canvas interliner or section 29. This bag in the embodiment shown is about 8 feet by 3 feet in dimension sealed about three sides and having an open end that can be sealed by groove zipper 30, FIG. 5. Each bag (FIG. 4) is equipped with an opening 31 to its interior, surrounded by a rubber gasket or other pressure sensitive sealing unit 32. As seen in FIGS. 3 and 4, a hollow tube 33 may be inserted through the opening 31 and sealed therein by gasket 32 to afford access to the interior 34 (FIG. 6) of the bag. When tube 33 is connected to a suitable vacuum source through the means of a connecting hose 35 (FIG. 6) and regulating valve 36, this connection serves to evacuate the bag itself. As seen in FIG. 6 this tube 33 at its inner end is flush with the interliner 29 of bag 27 so as not to protrude into interior 34 of bag 27.

Referring to FIGS. 3 and 7 mounted upon the conveyor 25 is a bag spreading or separator device 37 including extendable rods 38. There are four of these rods 38 two above and two below the plane of the conveyor 25 which are joined together to form a separator or spreading unit to spread the bag apart. Connected to the connecting joint 39 of these rods are further horizontal rods 40, one being shown in FIG. 3, it being understood that a similar rod would be in parallel relationship in the lower position connected to the lower pivot point 39. These rods 38 and 40 form the bag separating device 37 so that when a plastic bag 27 is placed over the separator 37, the bag will originally take an open or extended position.

As seen in FIG. 3, mounted adjacent the bag is a fan 41 blowing air into the open end of the bag 27 when placed over the separator frame 37 and serves to further open or inflate the bag 27 so that a unit 24 (FIG. 3) moving along the conveyor 25 will be able to enter the bag 27 without there being any question of one of the uplifted edges 42 or 43 of the unit catching or coming into contact with the bag 27 while the unit is entering into the bag.

Once the bag 27 has been opened and the unit has been placed therein, as above described, the bag 27 and unit 24 are together removed from the conveyor 25 and the zipper or tongue closure 30 is sealed. Then as seen in FIG. 6, the tube 33 is connected through hose 35 and valve 36 to a suitable source of vacuum (not shown) and air evacuated from the interior 34 of bag 27. With the vacuum line 35 still connected, the bag 27, containing unit 24, is dipped into or placed into a hot liquid 44 (FIG. 8) which may be water, for a minute or so. As seen in FIGS. 8 and 9 this liquid 44 is confined within a tank 45 which has heating coils 46 disposed therein so as to maintain the temperature of the liquid at an elevated state.

During this phase the unit 24 is preliminarily pressed under the heat and pressure of the liquid. By evacuating the bag it is possible to withdraw residual vapors from the thermoplastic material and the resulting evacuated condition throughout the total area of the sandwich reduces the pressure within the assembly to as near zero as practicable. This produces a differential of pressure between the inside of the unit so that the greater pressure developed outside the unit presses on the outside surfaces of the unit and distributes an even pressure over all the outside surface area of the unit. Therefore, in summary, by creating a vacuous condition within the bag and by maintaining it during the immersion of the unit, entrapped air is exhausted from between the layers of the unit and in combination with the pressure this brings the surfaces of the plastic interlayer into more intimate relationship with the opposed glass surfaces. A satisfactory edge seal is thus obtained and it has been found that a preliminary pressing of the glass-plastic sandwich or unit 24 has been effected throughout the entire body thereof.

When the bag is removed from the water, with the unit now in its preliminary pressed state, the zipper 30 may be opened, the unit 24 may be removed from bag 27; the bag 27 replaced over spreader 37 and the bag 27 again blown open by the fan 41 ready to receive another unit 24. By following the method and apparatus hereinabove discussed it is possible to use the same bag 27, forty times or more without loss and it has been found that this is an important advantage of the method and apparatus hereinabove described.

By maintaining the vacuum connection during the heating step it is possible to insure maintenance of the proper evacuated condition in the bag 27 since oftentimes by reason of mechanical defects or related causes the bag 27 develops slight leaks which although not prohibiting the use of the bag, would impair the efficiency of the process.

There has hereinabove been described a method and apparatus which is particularly useful during the early stages in which the glass sheets and a plastic interlayer are prepared for preliminary pressing. This preliminary pressing takes place just before the two glass sheets and plastic interlayer are subjected to heat and pressure in order to form a laminated glass sandwich. This method and apparatus has been found to be of particular utility in that it provides a continual process of handling both the bags and sandwiches during insertion of the sandwiches into the bags with a minimum of operational interruption.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

We claim:
1. In an apparatus for inserting a unit composed of two glass sheets and an interposed interlayer into a flexible bag, the combination of, a conveyor for moving the unit along a path, spreading means mounted on said conveyor interposed in the path of said unit to initially open a flexible bag inserted about said spreading means, said spreading means including four extendable rods, two of said rods being positioned above the plane of the conveyor and two of the rods being positioned below the plane of the conveyor and a pair of auxiliary rods, one auxiliary rod being positioned above the plane of the conveyor and one auxiliary rod being positioned below the plane of the conveyor, each of said auxiliary rods being attached to the connecting joints of the adjacent extendable rods so as to form a separator frame to receive the flexible bag and to hold said bag in an expanded position, and means for further expanding said bag while positioned on said spreading means to insure that no portion of the unit moving along the conveyor will contact the bag until after the unit has been fully inserted in the bag, said last-mentioned means including a fan mounted so as to direct a stream of air into said bag and through the open end of the bag held in an extended position by said spreading means.

2. In an apparatus as claimed in claim 1, wherein said auxiliary rods are horizontally disposed.

References Cited in the file of this patent

UNITED STATES PATENTS

| | | |
|---|---|---|
| 2,054,864 | Owen | Sept. 22, 1936 |
| 2,666,466 | Sharat | Jan. 19, 1954 |
| 2,673,016 | Gerbe | Mar. 23, 1954 |
| 2,751,134 | Walldow | June 19, 1956 |
| 2,770,084 | Ruderman | Nov. 13, 1956 |
| 2,783,176 | Boicey | Feb. 26, 1957 |
| 2,851,838 | McIntyre et al. | Sept. 16, 1958 |

FOREIGN PATENTS

| | | |
|---|---|---|
| 777,396 | Great Britain | June 19, 1957 |